US012601716B2

(12) United States Patent
Hirao et al.

(10) Patent No.: US 12,601,716 B2
(45) Date of Patent: Apr. 14, 2026

(54) SONIC INSPECTION DEVICE, SONIC INSPECTION METHOD, AND CONTACT MEMBER FOR SONIC INSPECTION DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Akiko Hirao, Kawasaki (JP); Noriko Yamamoto, Yokohama (JP); Tomio Ono, Yokohama (JP); Yutaka Nakai, Yokohama (JP)

(73) Assignees: KABUSHIKI KAISHA TOSHIBA;, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 287 days.

(21) Appl. No.: 18/460,083

(22) Filed: Sep. 1, 2023

(65) Prior Publication Data

US 2024/0295532 A1 Sep. 5, 2024

(30) Foreign Application Priority Data

Mar. 2, 2023 (JP) ................................. 2023-031728

(51) Int. Cl.
*G01N 29/24* (2006.01)
*G01N 29/04* (2006.01)
(52) U.S. Cl.
CPC ....... *G01N 29/2437* (2013.01); *G01N 29/046* (2013.01)
(58) Field of Classification Search
CPC .. G01N 29/2437; G01N 29/046; G01N 29/04; G01N 29/265; G01N 29/28; G01N 29/225
See application file for complete search history.

(56) References Cited

U.S. PATENT DOCUMENTS

2021/0123890 A1 4/2021 Hirao et al.
2022/0291174 A1* 9/2022 Hirao ................... G01N 29/265
(Continued)

FOREIGN PATENT DOCUMENTS

JP 2012-018071 A 1/2012
JP 2020-053956 A 4/2020
(Continued)

OTHER PUBLICATIONS

European Search Report issued in the corresponding EP Application No. 23195093.2 dated May 31, 2024 (8 pages).

*Primary Examiner* — Tarun Sinha
(74) *Attorney, Agent, or Firm* — Foley & Lardner LLP

(57) ABSTRACT

A sonic inspection device of an embodiment includes: a sonic probe including a transducer configured to execute at least one of transmission and reception of a sound wave; and a contact member including: a first sheet-like member containing an elastomer and having a first surface that comes into contact with a sonic function surface of the sonic probe directly or with an intermediate member therebetween and a second surface opposite the first surface; and a second sheet-like member having a plurality of openings and provided in contact with the second surface of the first sheet-like member. The second sheet-like member includes a high-hardness member provided in at least a part in contact with the second surface and containing at least one selected from a polymer, a metal member, and a ceramic member higher in Young's modulus at room temperature than the first sheet-like member.

8 Claims, 6 Drawing Sheets

(56)     References Cited

U.S. PATENT DOCUMENTS

| | | |
|---|---|---|
| 2023/0079884 A1 | 3/2023 | Yamamoto et al. |
| 2024/0219354 A1 | 7/2024 | Hirao et al. |

FOREIGN PATENT DOCUMENTS

| | | |
|---|---|---|
| JP | 2021-067603 A | 4/2021 |
| JP | 2022-141589 A | 9/2022 |

* cited by examiner

FIG. 2

SONIC INSPECTION DEVICE, SONIC INSPECTION METHOD, AND CONTACT MEMBER FOR SONIC INSPECTION DEVICE

CROSS REFERENCE TO RELATED APPLICATION

This application is based upon and claims the benefit of priority from Japanese Patent Application No. 2023-031728, filed on Mar. 2, 2023; the entire contents of which are incorporated herein by reference.

FIELD

Embodiments disclosed herein relate to a sonic inspection device, a sonic inspection method, and a contact member for sonic inspection device.

BACKGROUND

A sonic inspection device using the propagation of a sound wave such as an ultrasonic wave and an elastic wave is used for inspecting various members, devices, infrastructures, and so on. An ultrasonic inspection device is also used for medical diagnosis and the like. In the case where a probe for sonic inspection, which is used in such inspection devices, having a sonic receiver, a sonic transmitter, a sonic transceiver, or the like represented by an ultrasonic probe, an AE (Acoustic Emission) sensor, or the like is installed on an object to be inspected, a liquid or viscous couplant such as glycerin, vaseline, or oil is interposed between the object to be inspected and a sonic function surface, of the probe, that functions as at least one of surfaces for transmitting a sound wave and for receiving a sound wave so that the sound wave is efficiently propagated between the probe for sonic inspection and the object to be inspected. This is because, if air which is greatly different in acoustic impedance from a material forming the probe and a material forming the object to be inspected is present between these materials, it reflects sound, making the propagation of the sound very difficult.

The aforesaid couplant efficiently transmits the sound wave such as an ultrasonic wave from the probe to the object to be inspected or from the object to be inspected to the probe and thus is important for increasing inspection accuracy. However, the processes of applying and removing the liquid or viscous couplant are troublesome. This is a factor for increasing the inspection time and man-hours. Some objects to be inspected may be contaminated by the couplant, and in this case, the inspection itself cannot be conducted.

A solid couplant has also been proposed, but it is far inferior in ultrasonic propagation to the liquid couplant. A solid couplant containing an elastomer sheet or the like that easily comes into close contact with an object to be inspected has also been proposed to avoid the presence of air between an installation surface of the couplant for sonic inspection and the object to be inspected. However, if the couplant containing an elastomer or the like is only used, it is not possible to slide the couplant, necessitating peeling a probe together with the couplant from the object to be inspected when its installation position is moved. In light of this, it has been proposed that a sheet-like member having a plurality of openings, such as a polymer mesh, is disposed on a surface, of the couplant, in contact with the object to be inspected, and when a pressure is applied, the couplant is brought into contact with the object to be inspected through the openings, and when no pressure is applied, the probe is slid on the object to be inspected with the sheet-like member therebetween. However, if the elastomer sheet and the polymer sheet are simply stacked, their contact surfaces tend to hinder the propagation of a sound wave, leading to a disadvantageous difficulty in sufficiently enhancing inspection sensitivity and inspection accuracy.

BRIEF DESCRIPTION OF THE DRAWINGS

FIG. 2 is a sectional view illustrating a second example of the sonic inspection device of the first embodiment.

DETAILED DESCRIPTION

A sonic inspection device of an embodiment includes: a sonic probe including a transducer configured to execute at least one of transmission and reception of a sound wave, the sonic probe having a sonic function surface constituting at least one of surfaces for transmitting the sound wave and for receiving the sound wave; a contact member including a first sheet-like member and a second sheet-like member; and a loading mechanism that applies a load to the sonic probe. In the sonic inspection device of the embodiment, the contact member includes: the first sheet-like member containing an elastomer and having a first surface that comes into contact with the sonic function surface of the sonic probe directly or with an intermediate member therebetween and a second surface opposite the first surface; and the second sheet-like member having a plurality of openings and provided in contact with the second surface of the first sheet-like member, and the second sheet-like member includes a high-hardness member provided in at least a part in contact with the second surface and containing at least one selected from the group consisting of a polymer, a metal member, and a ceramic member higher in Young's modulus at room temperature than the first sheet-like member.

A sonic inspection device, a sonic inspection method, and a sonic inspection device contact member of embodiments will be hereinafter described with reference to the drawings. In the embodiments, substantially the same constituent parts will be denoted by the same reference signs and a description thereof may be partly omitted. The drawings are schematic, and the relationship between the thickness and the planar dimension of each part, a thickness ratio among the parts, and so on may be different from actual ones. In the description, a term expressing the up-down direction indicates a relative direction when an inspection surface of an object to be inspected is defined as an upper side, and may differ from an actual direction based on a gravitational acceleration direction.

A sound wave mentioned here is a generic name for all the elastic vibration waves propagated in an elastic body regardless of whether it is gas, liquid, or solid and includes not only sound waves in an audible frequency range but also ultrasonic waves having frequencies higher than the audible frequency range, low-frequency sounds having frequencies lower than the audible frequency range, and so on. The frequency of the sound wave is not limited and includes high frequencies to low frequencies.

First Embodiment

Figure 1:
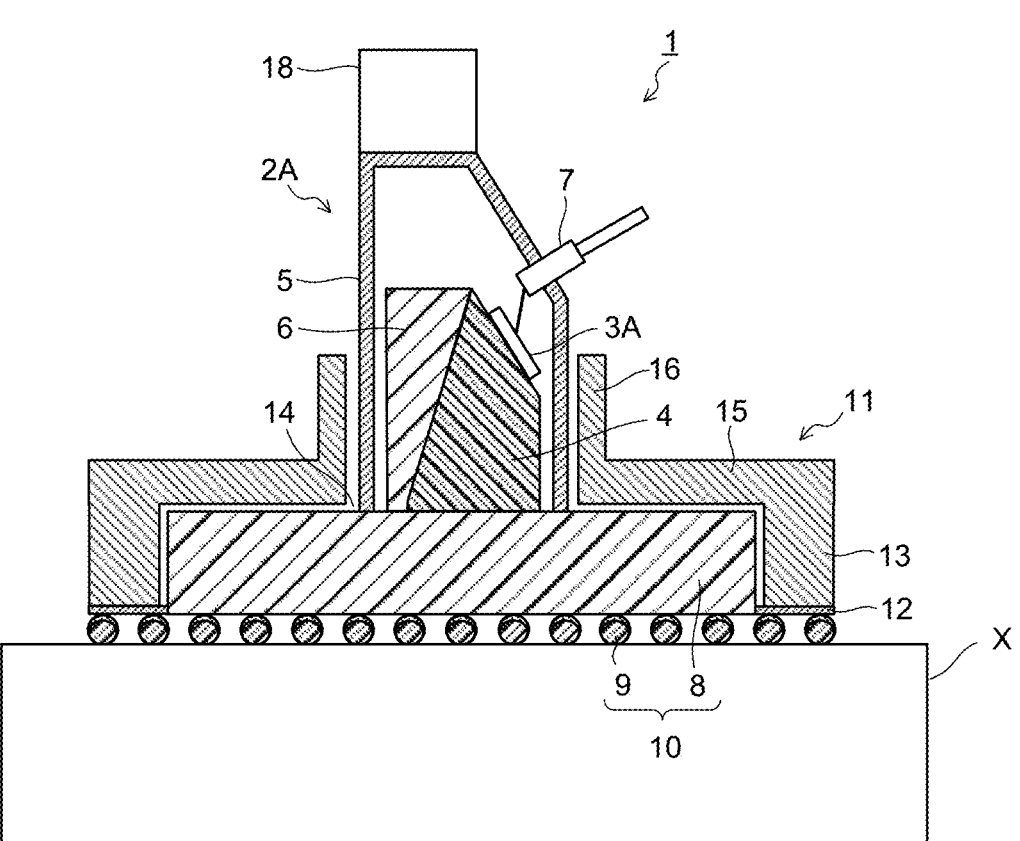
FIG. 1 is a sectional view illustrating a first example of a sonic inspection device of a first embodiment.
Figure 2:
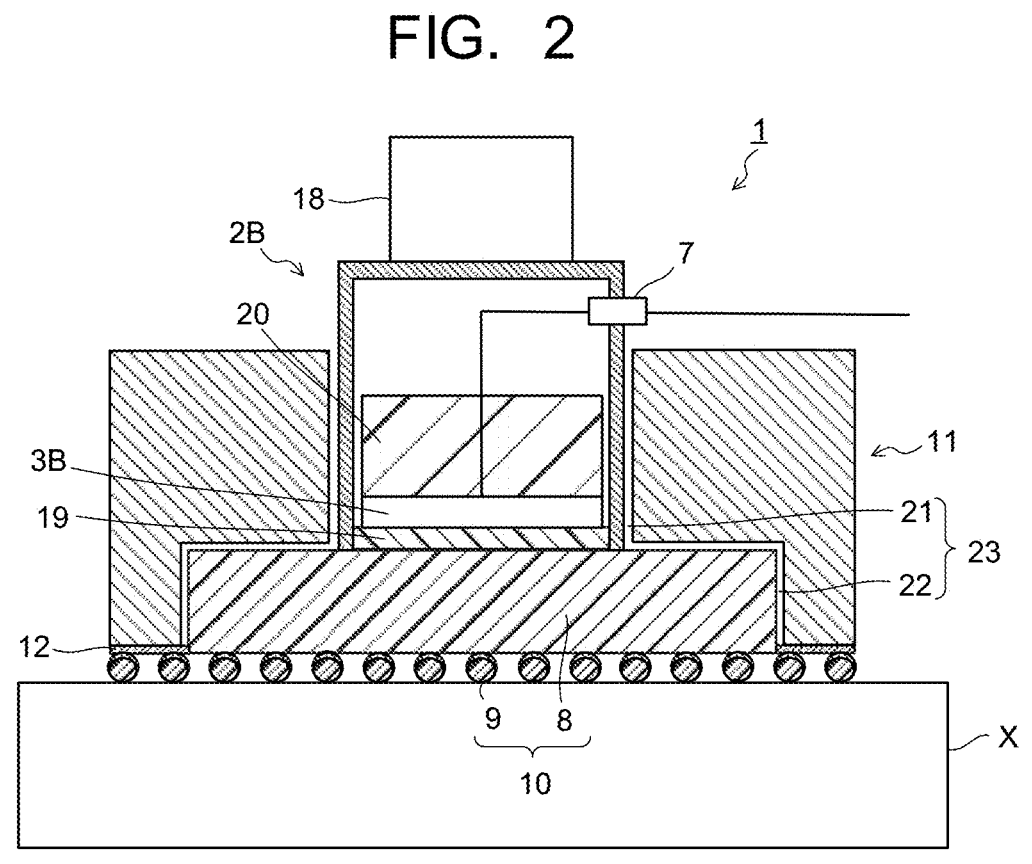

FIG. 1 and FIG. 2 are views illustrating sonic inspection devices 1 of a first embodiment. FIG. 1 illustrates the sonic inspection device 1 including an angle sonic probe 2A, and FIG. 2 illustrates the sonic inspection device 1 including a normal sonic probe 2B. The sonic inspection devices 1 in FIG. 1 and FIG. 2 are different in whether the sonic probe 2 is of an angle type or a normal type and in the shape of a holder 11 for a contact member 10 including a first sheet-like member 8 and a second sheet-like member 9, and except for these, they have basically the same configuration. The sonic inspection devices 1 illustrated in FIG. 1 and FIG. 2 will be described in detail below.

As described above, the sonic inspection device 1 illustrated in FIG. 1 includes the angle sonic probe 2A, and the sonic inspection device 1 illustrated in FIG. 2 includes the normal sonic probe 2B. For example, the sonic inspection device 1 has the sonic probe 2 (2A, 2B) of a pulse-echo type and performs a nondestructive inspection such as flaw detection, film thickness measurement, or the like by measuring a sound wave (reflected wave) returning from an inspection target such as a flaw in the object to be inspected. Instead, the sonic probe 2 may perform a nondestructive inspection such as flaw detection by measuring a sound wave such as a pressure wave generated by an inspection target. The sonic probe 2 has at least one of the functions of transmitting and receiving the sound wave, and specific examples thereof include an ultrasonic transceiver (ultrasonic transducer) and a sonic receiver. Further, as the sonic probe 2, a medical ultrasonic probe is usable, and examples thereof include a linear array probe in which transducers in a strip shape are arranged. Typical examples of the ultrasonic transceiver include an ultrasonic probe. Typical examples of the sonic receiver include an AE sensor. The sonic probe 2 may be a sonic transmitter.

In the sonic inspection device 1 of the embodiment, the sonic probe 2 has a transceiving surface, a receiving surface, a transmitting surface, and so on for a sound wave. Here, a surface constituting at least one of the sound wave transmitting surface and receiving surface of the sonic probe will be called a sonic function surface. The sonic probe 2 having such a sonic function surface is an ultrasonic probe as an ultrasonic transceiver, for instance. The ultrasonic probe 2 includes an ultrasonic transceiving element 3 (3A, 3B)

having a transducer (piezoelectric body) for ultrasonic flaw detection and electrodes provided on the upper and lower surfaces of the transducer. The ultrasonic transceiving element 3A of the angle type is disposed on a shoe 4 having a predetermined angle and, in this state, is housed in a case 5. The ultrasonic transceiving element 3B of the normal type is disposed on a retarder 19, and in this state, is housed in a case 5.

The ultrasonic transceiving element 3 (3A, 3B) may be disposed on a wave receiving plate as required. In the sonic probe 2A using the ultrasonic transceiving element 3A of the angle type, a sound absorbing material 6 may be provided on the rear side of the shoe 4. In the sonic probe 2B using the ultrasonic transceiving element 3B of the normal type, a damper 20 may be disposed on the ultrasonic transceiving element 3B. The ultrasonic transceiving element 3 (3A, 3B) may be disposed on an intermediate member such as the shoe 4 or the retarder 19 as described above. The not-illustrated electrodes of the ultrasonic transceiving element 3 are electrically connected to a connector 7 provided on the case 5. The constituent materials, structures, and so on of the transducer, the ultrasonic transceiving element 3, the shoe 4, the sound absorbing material 6, the retarder 19, the damper 20, the wave receiving plate, and so on may be those in known ultrasonic probes and are not limited.

In the case where the sonic probe 2 is a sonic receiver such as an AE sensor, the same configuration as that of the ultrasonic probe 2 is employed except that a sonic receiving element having a transducer (piezoelectric body) for AE reception is used. In this case, the constituent materials, structures, and so on of the transducer for AE reception, the sonic receiving element, the wave receiving plate, and so on may be those of known transducers for AE reception.

The sonic inspection device 1 of the embodiment may have the shoe 4 made of a polymeric material or an intermediate member called the retarder 19 in the case where the sonic probe 2 is an ultrasonic probe having at least one of the functions of transmitting and receiving a sound wave. As illustrated in FIG. 1, in the angle ultrasonic probe 2A, the transducer may be installed on the shoe 4. As the shoe material, acrylic, polystyrene, polyetherimide, or the like is used. In the normal ultrasonic probe 2B, the transducer may be installed on the retarder 19 as illustrated in FIG. 2. The shoe made of the polymeric material or the intermediate member called the retarder is in contact with the sonic function surface of the ultrasonic probe 2, for instance. Further, on the outer peripheral surface functioning as at least one of the sound wave transmitting surface and receiving surface of the intermediate member, a contact member 10 including a first sheet-like member 8 containing an elastomer to function as a sonic propagating part and a second sheet-like member 9 having a plurality of openings is provided.

The first sheet-like member 8 containing the elastomer is a couplant and comes into close contact with an object X to be inspected through the openings of the second sheet-like member 9 as will be described later. The first sheet-like member 8 contains the elastomer and is, for example, an elastomer sheet. The second sheet-like member 9 having the openings is constituted by, for example, a polymer mesh sheet, and the polymer mesh sheet is higher in Young's modulus at room temperature than the elastomer sheet constituting the first sheet-like member 8. The contact member 10 including the first sheet-like member 8 and the second sheet-like member 9 having the openings is held by the holder 11, and in this state, is attached to the sonic probe 2. The contact member 10 is partly fixed to the holder 11.

The second sheet-like member 9 having the openings is partly bonded and fixed to the holder 11 using an adhesive sheet 12. The sonic inspection device 1 is placed on the object X to be inspected with the contact member 10 coming into contact with the object X to be inspected. The sonic inspection device 1 is of a pulse-echo type, for instance, and executes a nondestructive inspection of a flaw or the like in the object X to be inspected by measuring a sound wave from the object X to be inspected.

A measured value of the frictional force of the elastomer forming the first sheet-like member 8 is overwhelmingly larger than those of other materials. It is inferred that this large frictional force comes from the phenomenon that is observed as a result of a great increase in its contact area when the elastomer deforms. Even if hard materials such as metals are tried to be brought into contact with each other, only tips of uneven parts of the contact surfaces, specifically, tips of minute projections which occupy only a minute part of the contact surfaces, come into contact. On the other hand, a material with a low modulus of elasticity such as the elastomer comes to have a large contact area even under the same load, and thus its adsorption force increases owing to the large contact area. Further, the viscoelasticity of the elastomer acts to increase the force of peeling off the adsorption interface with which it is in contact, which will be a factor for increasing the coefficient of friction. Being thus large in practical (microscopic) contact area with the object X to be inspected, the elastomer can transmit an ultrasonic wave efficiently. However, one that more easily transmits the ultrasonic wave has a larger frictional force and thus is more difficult to peel off.

Figure 3:
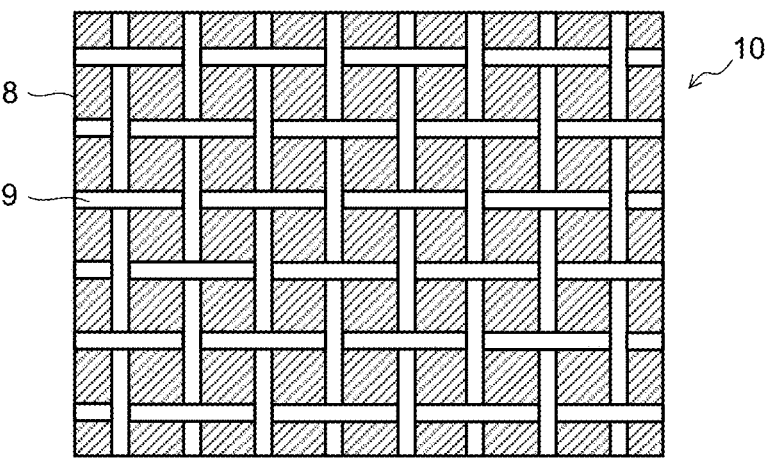
FIG. 3 is a plan view illustrating a stack of a first sheet-like member and a second sheet-like member of the sonic inspection devices illustrated in FIG. 1 and FIG. 2, seen from an object to be inspection side.

Therefore, in the contact member 10 illustrated in FIG. 1 and FIG. 2, the second sheet-like member 9 constituted by, for example, the polymer mesh sheet is provided on the surface of the first sheet-like member 8 constituted by the elastomer sheet. The second sheet-like member 9 having the openings is formed of a material higher in modulus of elasticity than the first sheet-like member 8 containing the elastomer. As illustrated in the plan view of the contact member 10 seen from the object X to be inspected side in FIG. 3, the second sheet-like member 9 having the openings is present on an outermost surface (an outermost surface on the object X to be inspected side) of the contact member 10, and the first sheet-like member 8 containing the elastomer is present in the openings of the second sheet-like member 9.

When the contact member 10 including such a first sheet-like member 8 and such a second sheet-like member 9 is used, under no load condition, bulges of an uneven part of the surface of the second sheet-like member 9 having a high modulus of elasticity are in contact with the object X to be inspected, and the first sheet-like member 8 containing the elastomer is not in contact with the object X to be inspected, so that the bulges of the second sheet-like member 9 slide on the object X to be inspected, enabling the movement with a small frictional force. This is because the material forming the second sheet-like member 9 is harder than the material of the first sheet-like member 8, and the contact area of the bulges with the object X to be inspected is small. Under loaded condition, the first sheet-like member 8 containing the elastomer deforms to stick out between the bulges of the second sheet-like member 9 having the openings and comes into contact with the object X to be inspected. This enables the efficient propagation of the sound wave.

Figure 4:
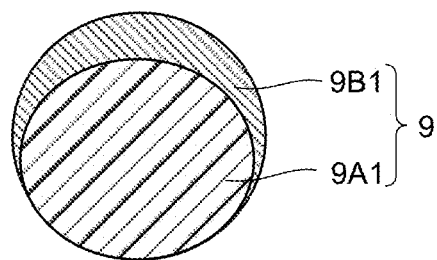
FIG. 4 is an enlarged sectional view of the second sheet-like member of the sonic inspection devices illustrated in FIG. 1 and FIG. 2.
Figure 5:
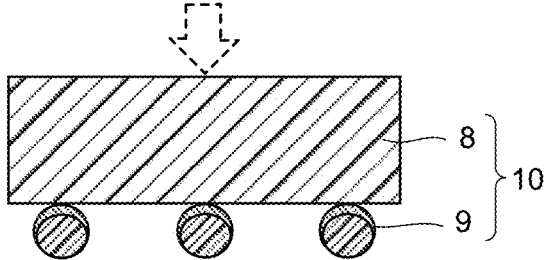
FIG. 5 is a view illustrating the state of the first sheet-like member and the second sheet-like member under no load condition in the sonic inspection devices illustrated in FIG. 1 and FIG. 2.

As illustrated in FIG. 4, the mesh sheet constituting the second sheet-like member 9 includes a mesh base 9A1 formed of a polymer or the like and a high-hardness layer 9B1 provided in parts, of the mesh base 9A1, in contact with the first sheet-like member 8. The high-hardness layer 9B1 is higher in Young's modulus at room temperature than the mesh base 9A1 and is formed of a polymer member, a metal member, a ceramic member, or a composite member of these having such a Young's modulus. As for the contact member 10, under no load condition, the second sheet-like member 9 is partly in contact with the first sheet-like member 8 as illustrated in FIG. 5.

Figure 6:
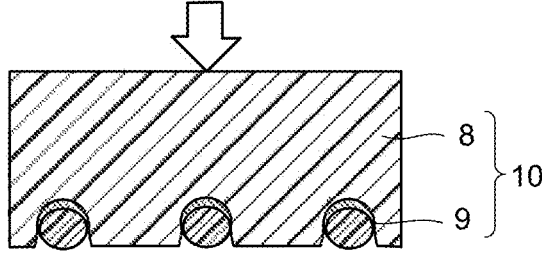
FIG. 6 is a view illustrating the state of the first sheet-like member and the second sheet-like member under loaded condition in the sonic inspection devices illustrated in FIG. 1 and FIG. 2.

On the other hand, under loaded condition, the first sheet-like member 8 is pressed into the second sheet-like member 9 by the load as illustrated in FIG. 6, so that the first sheet-like member 8 comes into contact with the object X to be inspected through the openings of the second sheet-like member 9 (for example, mesh parts of the mesh sheet). In the pressed state, part of the second sheet-like member 9, for example, in the case where the mesh sheet illustrated in FIG. 4 is used as the second sheet-like member 9, the high-hardness layer 9B1 provided on the surface of the mesh base 9A1 is pressed against the first sheet-like member 8 constituted by the elastomer sheet.

At this time, it is possible to efficiently propagate the sound wave between the first sheet-like member 8 and the second sheet-like member 9 in the pressed state since the high-hardness layer 9B1 is higher in Young's modulus at room temperature than the mesh base 9A1. This enables sufficient enhancement in inspection sensitivity and inspection accuracy. Further, since the high-hardness layer 9B1 plays a role of increasing the slipperiness of the first sheet-like member 8, it is possible to increase the adhesion of the first sheet-like member 8 to the second sheet-like member 9, specifically, its adhesion to the mesh base 9A1 of the second sheet-like member 9. This also improves the propagation of the sound wave between the first sheet-like member 8 and the second sheet-like member 9, enabling sufficient enhancement in inspection sensitivity and inspection accuracy. In the contact member 10 of the sonic inspection device 1 of the embodiment, the thickness of the first sheet-like member 8 containing the elastomer is preferably not less than 10 μm nor more than 10 mm. Its appropriate thickness differs depending on the acoustic impedance and the Young's modulus of the material forming the first sheet-like member 8, but especially when the thickness is not less than about 0.2 mm nor more than about 2 mm, sound wave propagation performance is high, and it is also possible to increase lubricity on the object X to be inspected. Examples of the elastomer contained in the constituent material of the first sheet-like member 8 include a thermosetting elastomer and a thermoplastic elastomer, and either of these is usable in the first sheet-like member 8 of the embodiment. The thermoplastic elastomer is a copolymer of two kinds or more of polymers whose moduli of elasticity are different in temperature dependence, for instance. Since the elastomer used in the embodiment has a certain level of viscoelasticity and can stick to a target, it contaminates the surroundings less than other couplants such as water and oil, and being solid, it can be removed easily and is reusable. Since the couplant expels the air layer when pressed, the elastic constant (Young's modulus at room temperature) of the used elastomer is preferably 0.1 MPa or more and less than 0.1 GPa. Its yield stress which is a stress at which plastic deformation of a material starts is preferably high, and is preferably 2 MPa or more, and more preferably 20 MPa or more. Its tensile strength is also preferably high and is preferably 2 MPa or more. Note that the Young's modulus at room temperature is based on the JIS Standard.

Examples of the thermoplastic elastomer mainly forming the first sheet-like member 8 include a polystyrene-based thermoplastic elastomer (SBC, TPS), a polyolefin-based thermoplastic elastomer (TPO), a vinyl chloride-based thermoplastic elastomer (TPVC), a polyurethane-based thermoplastic elastomer (TPU), a polyester-based thermoplastic elastomer (TPEE, TPC), and a polyamide-based thermoplastic elastomer. Examples of the thermosetting elastomer include: styrene-butadiene rubber (SBR), isoprene rubber (IR), butadiene rubber (BR), chloroprene rubber (CR), and acrylonitrile-butadiene rubber (NBR) which are classified as diene rubber; and butyl rubber such as isobutylene-isoprene rubber (IIR), ethylene-propylene rubber (EPM), ethylene-propylene-diene rubber (EPDM), urethane rubber (U), silicone rubber, and fluorine rubber (FKM) which are classified as non-diene rubber. Examples of other rubber include chlorosulfonated polyethylene (CSM), chlorinated polyethylene (CM), acrylic rubber (ACM), polysulfide rubber (T), and epichlorohydrin rubber (CO, ECO). Since these materials have different properties such as heat resistance, abrasion resistance, oil resistance, chemical resistance, and so on, it is preferable to select an appropriate material for each object to be inspected. Depending on the use, a mixture of a plurality of elastomers may be used. An additive having a size not preventing the transmission of a sound wave, specifically, having a diameter of approximately 200 μm or less may be mixed.

The second sheet-like member 9 preferably has the openings with the opening ratio of 50% or more. By the second sheet-like member 9 having the opening ratio of 50% or more, it is possible to increase the propagation efficiency of the sound wave between the first sheet-like member 8 as the couplant and the object X to be inspected. The opening ratio is a ratio of the opening area (the total area of the openings projected on a plane) to the total area of the second sheet-like member 9. It is preferable to appropriately select the minimum width of non-opening parts, the minimum width of the openings, and so on according to the Young's modulus and the acoustic impedance of the material used in the first sheet-like member 8.

As the second sheet-like member 9 having the openings, a mesh sheet is usable. The mesh sheet is formed of filaments (mesh base) of a polymer or the like that are woven such that meshes (openings) with a desired size are formed, and the mesh parts (aperture parts) are the openings. In the case where the second sheet-like member 9 is the mesh sheet, it is not limited to what is called a plain weave one formed of warp yarns and weft yarns alternately crossing over each other. It may be a twill weave one formed of warp yarns and weft yarns with the weft yarns each crossing over, for example, every two warp yarns, or may be a satin weave one. Further, one in which warp yarns and weft yarns are not orthogonally knitted, for example, one in which the warp yarns are inclined by about 20 degrees may be used. Further, one in which mesh intersections are fused is desirable because this increases the strength of the second sheet-like member 9 having the openings. The second sheet-like member 9 is not limited to the mesh sheet and may be a sheet member such as a polymer sheet, a metal sheet, or a ceramic sheet in which a plurality of openings (holes) are provided.

In the second sheet-like member 9 having the openings, in the case where the second sheet-like member 9 is the mesh sheet, the diameter of yarns forming the bulges, that is, forming the mesh, is preferably not less than 10 μm nor more than 500 μm. In the case where the second sheet-like member 9 is the sheet in which the openings are formed, the distance between the openings is preferably not less than 10 μm nor more than 500 μm. This was found out from the measurement of sound propagation performance under loaded condition and a coefficient of friction with the object X to be inspected under no load condition. If the second sheet-like member 9 having the openings departs from this range, sonic propagation performance tends to decrease or slipperiness on the object X to be inspected tends to be worse. The width between the bulges, that is, the major axis of each aperture of the mesh sheet or each opening of the sheet in which the openings are formed is preferably not less than 10 μm nor more than 2000 μm. If the minimum width between the bulges, that is, the minimum major axis of the apertures of the sheet or the openings of the sheet in which the openings are formed is over 2000 μm, in both cases, it may not be possible to sufficiently obtain the effect of reducing the frictional force ascribable to the contact of only the bulges with the object X to be inspected under no load condition. If the width between the bulges, that is, the minimum width of the apertures of the mesh or the major axis of the opening of the sheet is less than 10 μm, it may not be possible to bring the first sheet-like member 8 into sufficient contact with the object X to be inspected under loaded condition.

The second sheet-like member 9 is formed of a material higher in Young's modulus at room temperature than the first sheet-like member, that is, formed of a polymer member, a metal member, a ceramic member, or a composite member of these. The Young's modulus at room temperature of the second sheet-like member 9 is preferably 0.1 GPa or more. In the case of the second sheet-like member 9 having the mesh base 9A1 and the high-hardness layer 9B1 provided in the parts, of the mesh base 9A1, in contact with the first sheet-like member 8 as illustrated in FIG. 4, a material higher in Young's modulus at room temperature than the first sheet-like member (for example, a material whose Young's modulus at room temperature is 0.1 GPa or more) is used both for the mesh base 9A1 and the high-hardness layer 9B1, and further, for the high-hardness layer 9B1, a polymer member, a metal member, a ceramic member, or a composite member of these that is higher in Young's modulus at room temperature than the mesh base 9A1 is used.

In the case where the second sheet-like member 9 is the mesh sheet illustrated in FIG. 4, the mesh base 9A1 is preferably a polymer mesh in view of the contact with the object X to be inspected and the prevention of the occurrence of a surface flaw of the object X to be inspected caused by the contact. As the mesh base 9A1, it is preferable to use a mesh sheet formed of polyester, polyethylene, polypropylene, low-density polyethylene, high-density polyethylene, nylon, fluororesins such as trifluoroethylene chloride, tetrafluoroethylene, a tetrafluoroethylene-hexafluoropropylene copolymer, a tetrafluoroethylene-ethylene copolymer, or vinylidene fluoride, an ABS resin, polystyrene, a methacrylic resin, polycarbonate, polyacetal, polyurethane, polyvinylidene chloride, polyethylene terephthalate, liquid crystal, polyvinyl chloride, a polymethyl methacrylate resin (PMMA), or the like. However, other than the polymer mesh, a metal mesh or the like using a metal material such as copper, aluminum, or SUS may be used as the mesh base 9A1.

As the high-hardness layer 9B1 provided on such a mesh base 9A1, a polymer member, a metal member, a ceramic member, or a composite member of these that is higher in Young's modulus at room temperature than the mesh base 9A1 is usable. Out of these constituent materials, it is preferable to use a low-friction material such as molybdenum disulfide, tungsten disulfide, graphite, graphite fluoride, boron nitride, mica, talc, lead oxide, calcium fluoride, silicon oxide, gold, silver, tin, lead, martensitic, ferritic, or austenitic stainless steel, polytetrafluoroethylene, a tet-rafluoroethylene-perfluoroalkyl vinyl ether copolymer, a phthalocyanine compound, melamine cyanurate, or an amino acid compound. In the case where a fluorine-based resin such as polytetrafluoroethylene or a tetrafluoroethyl-ene-perfluoroalkyl vinyl ether copolymer out of the above is used, not only the high-hardness layer 9B1 but also the whole second sheet-like member 9 including the mesh base 9A1 and the high-hardness layer 9B1 may be formed of the aforesaid fluorine-based resin.

The high-hardness layer 9B1 may be provided on the mesh base 9A1 by a film deposition method such as a vapor deposition method, a sputtering method, a CVD method, a spin coating method, or a sol-gel method, or may be fixed on the mesh base 9A1 using a binder. Here, the binder may be one in which phosphate, silicate, or the like is dissolved in a solvent. It may be one in which any of various polymers such as a polyamide-imide resin, a phenol resin, an epoxy resin, and a polyimide resin is dissolved in a solvent or the like. The high-hardness layer 9B1 only needs to be provided in at least the parts, of the mesh base 9A1, in contact with the first sheet-like member 8, and in some cases, the con-stituent material of the high-hardness layer 9B1 may be used in the whole second sheet-like member 9. However, since the high-hardness layer 9B1 plays a role of improving the propagation efficiency of the sound wave between the first sheet-like member 8 and the second sheet-like member 9 and improving the slipperiness of the first sheet-like member 8, the high-hardness layer 9B1 is preferably provided only in the parts, of the mesh base 9A1, in contact with the first sheet-like member 8. The use of such a high-hardness layer 9B1 makes it possible to improve the propagation efficiency of the sound wave between the first sheet-like member 8 and the second sheet-like member 9 and improve the slipperiness of the first sheet-like member 8, and thus makes it possible to sufficiently enhance the inspection sensitivity and inspec-tion accuracy of the sonic inspection device 1 of the embodi-ment.

In the sonic inspection device 1 illustrated in FIG. 1, the holder 11 has a sidewall part (base member) 13 provided to surround the contact member 10, a cover part 15 covering the upper side of the sidewall part 13 and having an opening part 14, and a pressing part 16 surrounding the opening part 14 and extending upward in the same shape as that of the opening part 14. The opening part 14 is provided from the inside of the sidewall part 13 up to the inside of the pressing part 16. The adhesive sheet 12 is placed on the bottom of the sidewall part 13, and the second sheet-like member 9 having the openings is partly bonded and fixed to the holder 11 using the adhesive sheet 12. The sonic probe 2 is movably inserted in the opening part 14 formed in the holder 11.

The sonic probe 2 may be in a state of being only inserted in the pressing part 16 and the opening part 14 when used, or when it is used, the holder 11 may be fixed to and integrated with the sonic probe 2 using mechanisms such as plungers. The plungers are disposed and fixed in through holes provided in the sidewall part 13 (or the pressing part 16) of the holder 11, and fix the sonic probe 2 in a state where the sonic probe 2 is movable up and down and attachable/detachable, by pressing balls or pins at their tips against the sonic probe 2 by springs or the like provided inside. The holder 11 illustrated in FIG. 1 has the opening part 14 where to insert the sonic probe 2. Further, on the bottom of the holder 11, there is a space where to house the first sheet-like member 8 containing the elastomer, and the second sheet-like member 9 is installed on the bottom with the adhesive sheet 12 therebetween.

The holder 11 illustrated in FIG. 2 includes a stepped opening part 23 having a first opening 21 where to insert the sonic probe 2 and a second opening 22 where to insert the first sheet-like member 8 of the contact member 10. The first opening 21 and the second opening 22 communicate with each other. In a lower part of the holder 11, the second opening 22 as a space where to house the first sheet-like member 8 containing the elastomer is provided, and the first opening 21 as a space where to house the sonic probe 2 is provided thereabove. The second sheet-like member 9 hav-ing the openings is bonded and fixed to the bottom of the sidewall part 13 where the first opening 21 and the second opening 22 of the holder 11 are provided, with the adhesive sheet 12 therebetween. In FIG. 2, the sonic probe 2 is used in the state of being only inserted in the first opening 21. When the sonic probe 2 is used, the holder 11 may be fixed and integrated with the sonic probe 2 using mechanisms such as the plungers.

When the sonic inspection is conducted, a load applying device 18 applies a load P to the sonic probe 2. As a result, the load P is applied to the elastomer-containing first sheet-like member 8 in contact with the sonic function surface of the sonic probe 2. The first sheet-like member 8 is pressed against the second sheet-like member 9 having the openings, which is partly fixed to the holder 11. Since the second sheet-like member 9 having the openings is partly fixed to the holder 11, the first sheet-like member 8 containing the elastomer is filled in meshes of the second sheet-like mem-ber 9 having the openings to spread out toward the object X to be inspected, and air present between the object X to be inspected and the contact member 10 is expelled, so that the first sheet-like member 8 comes into direct contact with the object X to be inspected. This enables the propagation of the sound wave such as an ultrasonic wave from the sonic probe 2 to the object X to be inspected.

The load applying device 18 is an actuator of a mechani-cal type, a hydraulic type, a pneumatic type, an electromag-netic type, or the like. The load applying device 18 is installed on the sonic probe 2 and is configured to apply the load directly to the sonic probe 2 to thereby apply the load to the contact member 10 through the sonic probe 2. The mechanism 18 for applying the load to the sonic probe 2 and the contact member 10 may be any as long as it is capable of switching between the state of applying the load to the contact member 10 and the state where the load is removed, and its load applying method, the shape of its load applying member, and so on are not limited to specific ones. When the load applied by the load applying device 18 is removed, the deformation of the first sheet-like member 8 containing the elastomer caused by the load is alleviated, so that the second sheet-like member 9 having the openings changes to be mainly present on the interface with the object X to be inspected. This makes it possible to easily slide the sonic probe 2 integrated with the contact member 10 and the holder 11, on the object X to be inspected again.

By fixing part of the contact member 10 including the first sheet-like member 8 containing the elastomer and the sec-ond sheet-like member 9 having the openings to the holder 11, it is possible to efficiently propagate the sound wave between the contact member 10 and the object X to be inspected when the load is applied, and to move the sonic probe 2 integrated with the contact member 10 and the holder 11 on the object X to be inspected when the load is removed. Because of these, the nondestructive inspection by the sonic inspection device 1 and the movability of the sonic inspection device 1 are both achieved. Here, the holder 11 may be a resin member, a metal member, or the like formed with a 3D printer or the like, or may be a member formed of any of various materials, such as a member worked from wood, resin, metal, glass, or a composite material of these.

Second Embodiment

Figure 7:
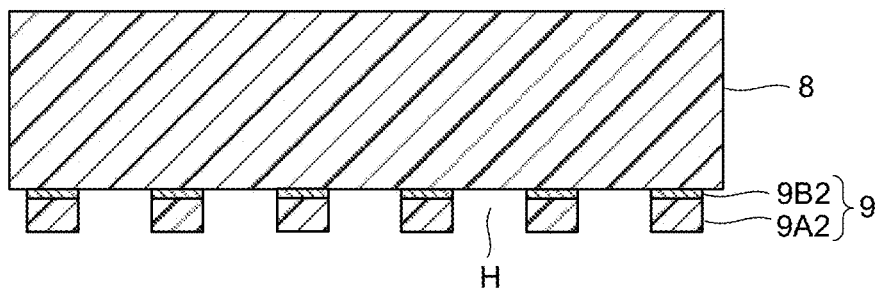
FIG. 7 is a sectional view illustrating a first example of a first sheet-like member and a second sheet-like member in a sonic inspection device of a second embodiment.
Figure 8:
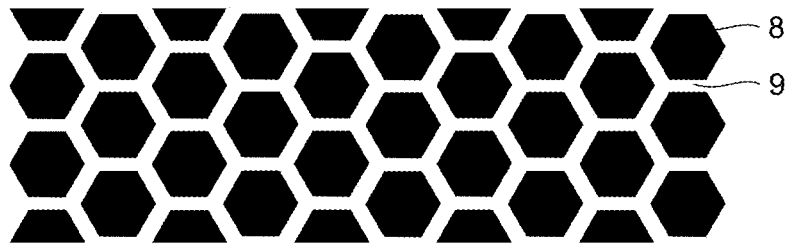
FIG. 8 is a plan view of a stack of the first sheet-like member and the second sheet-like member illustrated in FIG. 7, seen from an object to be inspected side.

FIG. 7 is a sectional view illustrating a first example of a first sheet-like member and a second sheet-like member in a sonic inspection device of a second embodiment. FIG. 8 is a plan view of a stack of the first sheet-like member and the second sheet-like member illustrated in FIG. 7, seen from an object to be inspected side. As illustrated in FIG. 7, the second sheet-like member may include a sheet member 9A2 such as a polymer sheet, a metal sheet, or a ceramic sheet in which a plurality of openings (holes) H are provided. Examples of a specific material of the polymer sheet, the metal sheet, or the ceramic sheet are the same as those in the first embodiment. An opening ratio by the openings H is preferably 50% or more as in the first embodiment. On the sheet member 9A2 having the openings H, a high-hardness layer 9B2 higher in Young's modulus at room temperature than the constituent material of the sheet member 9A2 is provided. Examples of the constituent material of the high-hardness layer 9B2 are the same as those in the first embodiment. The first sheet-like member 8 is the same as that in the first embodiment.

Figure 9:
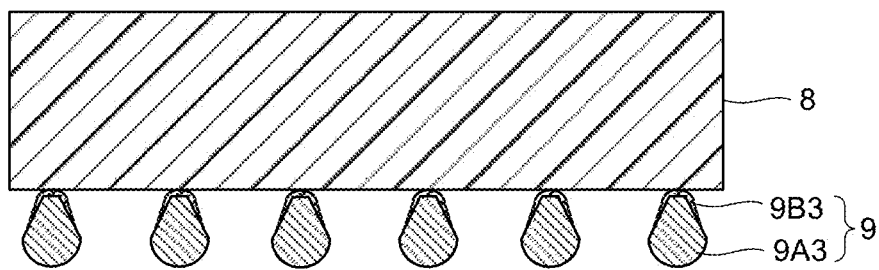
FIG. 9 is a sectional view illustrating a second example of the first sheet-like member and the second sheet-like member in the sonic inspection device of the second embodiment.
Figure 10:
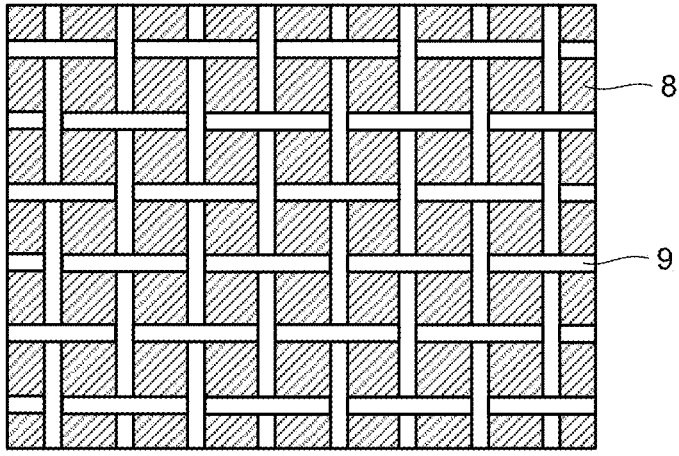
FIG. 10 is a plan view of the stack of the first sheet-like member and the second sheet-like member illustrated in FIG. 9, seen from the object to be inspected side.

FIG. 9 is a sectional view illustrating a second example of the first sheet-like member and the second sheet-like member in the sonic inspection device 1 of the second embodiment. FIG. 10 is a plan view of a stack of the first sheet-like member and the second sheet-like member illustrated in FIG. 9, seen from the object to be inspected side. As illustrated in FIG. 9, the second sheet-like member 9 has a mesh base 9A3 that is deformed into an elliptical shape by being stretched in the vertical direction, and in the upper portions of such a mesh base 9A3, the high-hardness layer 9B3 is provided. On such a second sheet-like member 9, the first sheet-like member 8 is disposed. The constituent materials of the mesh base 9A3 and the high-hardness layer 9B3 of the second sheet-like member 9 and the constituent material of the first sheet-like member 8 are the same as those in the first embodiment.

As described in the second embodiment, the form of the base (9A1, 9A2, 9A3) in the second sheet-like member 9 is not limited to the mesh sheet in which the warp yarns and the weft yarns with a circular cross section are woven as described in the first embodiment and may be any of various forms such as those of the sheet member 9A2 having the openings H and the mesh base 9A3 in which the deformed warp yarns and weft yarns are woven. As the second sheet-like member 9 having such a form as well, by employing the second sheet-like member 9 that is higher in Young's modulus at room temperature than the first sheet-like member 8 and in which the high-hardness layer 9B2, 9B3 higher in Young's modulus at room temperature than the constituent material of the base 9A2, 9A3 is provided on the base 9A2, 9A3, it is possible to improve the propagation efficiency of a sound wave between the first sheet-like member 8 and the second sheet-like member 9 and the slipperiness of the first sheet-like member 8, enabling sufficient enhancement in the inspection sensitivity and inspection accuracy of the sonic inspection device 1 of the embodiment.

EXAMPLES

Hereinafter, examples and their evaluation results will be described.

Examples 1, Comparative Examples 1

As shown in Table 1, Table 2, and Table 3, contact members with various combinations were prepared. Second sheet-like members variously worked were combined with first sheet-like members to fabricate the contact members. On surfaces (ultrasonic transceiving surfaces) of ultrasonic probes with a 2.0 MHz frequency, the aforesaid first sheet-like members were placed with their surfaces where the second sheet-like members were not pasted being pasted on the ultrasonic probes. Electromagnetic actuators were mounted on the ultrasonic probes to fabricate a plurality of ultrasonic inspection devices.

The moving properties of the aforesaid ultrasonic inspection devices were evaluated. A shear tensile test was first conducted to examine whether or not the ultrasonic inspection devices (ultrasonic probes) with only their weight could be moved in the state in which a further load was not applied. The ultrasonic probes were each connected to a load cell, placed on a stainless plate with a 32 μm surface roughness Rz, and moved on the stainless plate at a low speed, and coefficients of static friction were measured. As comparative examples, the measurement was also conducted regarding the cases where only an elastomer sheet was formed without the second sheet-like member being formed. As a result, it was found out that regarding all the elastomers, in the case where the second sheet-like member was not installed, the coefficient of static friction was very high and it was difficult to move the probe, but in all the cases where the second sheet-like member was installed, the coefficient of static friction was small, and it was possible to move the probe.

Next, an ultrasonic flaw detection test was conducted. A carbon steel block with a 500 mm length was prepared. The surface roughness Rz of a surface on which an ultrasonic wave was incident was 32 μm, and the surface roughness Rz of a surface on which the ultrasonic wave was reflected was 1.6 μm. The flaw detection test was conducted under the condition that a 25 kPa load was applied to the ultrasonic probes by the electromagnetic actuators to press the ultrasonic probes against the carbon steel block. Table 1, Table 2, and Table 3 show the test results together with the results of the coefficient of friction. As the Young's modulus of material B (high-hardness layer) in the second sheet-like member was higher, the amplitude of an echo waveform was larger and thus was more favorable. Further, as the Young's modulus of the sheet-like member was higher, the response speed was more favorable.

TABLE 1

| Measurement No. | Type and frequency of probe | Holder With or without | First sheet-like member Material | First sheet-like member Young's modulus GPa | First sheet-like member Thickness [mm] | Structure of second sheet-like member | Material A Material | Material A Young's modulus GPa | Material A Yarn diameter [μm] | Material A Aperture [μm] |
|---|---|---|---|---|---|---|---|---|---|---|
| 1 | Angle 2 MHz | Without | Hydrogenated styrene-based thermoplastic elastomer (SEBS) | 0.001 | 1.0 | — | None | — | — | — |
| 2 | Angle 2 MHz | Without | Hydrogenated styrene-based thermoplastic elastomer (SEBS) | 0.001 | 1.0 | Mesh | Polyester | 3.0 | 200 | 1092 |
| 3 | Angle 2 MHz | With | Hydrogenated styrene-based thermoplastic elastomer (SEBS) | 0.001 | 1.0 | Mesh | Polyester | 3.0 | 200 | 1092 |
| 4 | Angle 2 MHz | With | Hydrogenated styrene-based thermoplastic elastomer (SEBS) | 0.001 | 1.0 | Mesh | Polyester | 3.0 | 200 | 1092 |
| 5 | Angle 2 MHz | With | Hydrogenated styrene-based thermoplastic elastomer (SEBS) | 0.001 | 1.0 | Mesh | Polyester | 3.0 | 200 | 1092 |
| 6 | Angle 2 MHz | With | Hydrogenated styrene-based thermoplastic elastomer (SEBS) | 0.001 | 1.0 | Mesh | Polyester | 3.0 | 200 | 1092 |
| 7 | Angle 2 MHz | With | Hydrogenated styrene-based thermoplastic elastomer (SEBS) | 0.001 | 0.5 | Mesh | Polyester | 3.0 | 200 | 1092 |
| 8 | Angle 2 MHz | With | Hydrogenated styrene-based thermoplastic elastomer (SEBS) | 0.001 | 1.0 | Mesh | Polyester | 3.0 | 125 | 650 |
| 9 | Angle 2 MHz | With | Hydrogenated styrene-based thermoplastic elastomer (SEBS) | 0.001 | 1.0 | Mesh | Polyester | 3.0 | 125 | 650 |
| 10 | Angle 2 MHz | With | Hydrogenated styrene-based thermoplastic elastomer (SEBS) | 0.001 | 1.0 | Mesh | Polyester | 3.0 | 125 | 650 |
| 11 | Angle 2 MHz | With | Hydrogenated styrene-based thermoplastic elastomer (SEBS) | 0.001 | 1.0 | Mesh | Polyester | 3.0 | 125 | 650 |
| 12 | Angle 2 MHz | With | Hydrogenated styrene-based thermoplastic elastomer (SEBS) | 0.001 | 1.0 | Sheet having openings | PTFE | 0.6 | — | — |

Contact member — Material A of second sheet-like member (9A in FIG. 1); Material B of second sheet-like member (9B in FIG. 1); Evaluation result

| Measurement No. | Material A Sheet thickness [μm] | Material A Opening shape Opening ratio | Material B Material | Material B Film deposition method | Material B Young's modulus GPa | Material B Thickness [μm] | Coefficient of static friction under no load condition | Amplitude of echo waveform (arb. units) | Response speed (time required for echo waveform to reach 80% of saturation after load application) [ms] |
|---|---|---|---|---|---|---|---|---|---|
| 1 | — | — | None | — | — | — | 1.1 | 2.9 | — |
| 2 | — | — | None | — | — | — | 0.18 | 3 | 180 |
| 3 | — | — | SUS | Sputtering | 195 | 0.05 | 0.25 | 2.7 | 150 |
| 4 | — | — | Pt | Sputtering | 172 | 0.03 | 0.18 | 2.8 | 145 |
| 5 | — | — | Polyimide | Sputtering | 3 | 0.08 | 0.26 | 2.5 | 172 |
| 6 | — | — | Alumina | Sputtering | 3.9 | 0.05 | 0.18 | 2.8 | 170 |
| 7 | — | — | SUS | Sputtering | 195 | 0.05 | 0.25 | 2.7 | 150 |
| 8 | — | — | None | — | — | — | 0.2 | 3 | 200 |
| 9 | — | — | Au | Sputtering | 82 | 0.05 | 0.2 | 3.5 | 170 |
| 10 | — | — | Mica•polyimide | Binder | 5 | 0.1 | 0.2 | 3.8 | 175 |
| 11 | — | — | SiO2•polyimide | Binder | 5 | 0.1 | 0.2 | 2.8 | 163 |
| 12 | 200 | Hexagonal 70% | None | — | — | — | 0.25 | 2.4 | 170 |

TABLE 2

| Measurement No. | Type and frequency of probe | Holder With or without | First sheet-like member Material | Young's modulus GPa | Thickness [mm] | Structure of second sheet-like member | Material | Young's modulus GPa | Yarn diameter [μm] | Aperture [μm] |
|---|---|---|---|---|---|---|---|---|---|---|
| 13 | Angle 2 MHz | With | Hydrogenated styrene-based thermoplastic elastomer (SEBS) | 0.001 | 1.0 | Sheet having openings | Polyester | 3.0 | — | — |
| 14 | Angle 2 MHz | With | Hydrogenated styrene-based thermoplastic elastomer (SEBS) | 0.001 | 1.0 | Sheet having openings | Polyester | 3.0 | — | — |
| 15 | Angle 2 MHz | With | Hydrogenated styrene-based thermoplastic elastomer (SEBS) | 0.001 | 1.0 | Sheet having openings | Polyester | 3.0 | — | — |
| 16 | Angle 2 MHz | With | Hydrogenated styrene-based thermoplastic elastomer (SEBS) | 0.001 | 1.0 | Sheet having openings | Polyester | 3.0 | — | — |
| 17 | Normal 5 MHz | Without | SIS (Styrene-isoprene-styrene block copolymer) | 0.01 | 0.5 | — | None | — | — | — |
| 18 | Normal 5 MHz | With | SIS (Styrene-isoprene-styrene block copolymer) | 0.01 | 0.5 | Mesh | Polyester | 3.0 | 125 | 650 |
| 19 | Normal 5 MHz | With | SIS (Styrene-isoprene-styrene block copolymer) | 0.01 | 0.5 | Mesh | Polyester | 3.0 | 125 | 650 |
| 20 | Normal 5 MHz | With | SIS (Styrene-isoprene-styrene block copolymer) | 0.01 | 0.5 | Mesh | Polyester | 3.0 | 125 | 650 |
| 21 | Normal 5 MHz | With | Hydrogenated styrene-based thermoplastic elastomer (SEBS) | 0.001 | 1.0 | Mesh | Polyester | 3.0 | 125 | 650 |
| 22 | Normal 5 MHz | With | Hydrogenated styrene-based thermoplastic elastomer (SEBS) | 0.001 | 1.0 | Mesh | Polyester | 3.0 | 125 | 650 |
| 23 | Normal 5 MHz | With | Hydrogenated styrene-based thermoplastic elastomer (SEBS) | 0.001 | 1.0 | Mesh | Polyester | 3.0 | 125 | 650 |
| 24 | Normal 5 MHz | With | Hydrogenated styrene-based thermoplastic elastomer (SEBS) | 0.001 | 1.0 | Mesh | Nylon | 1.1 | 350 | 1190 |

| Measurement No. | Material A of second sheet-like member (9A in FIG. 1) Sheet thickness [μm] | Opening shape Opening ratio | Material B of second sheet-like member (9B in FIG. 1) Material | Film deposition method | Young's modulus GPa | Thickness [μm] | Coefficient of static friction under no load condition | Amplitude of echo waveform (arb. units) | Response speed (time required for echo waveform to reach 80% of saturation from load application) [ms] |
|---|---|---|---|---|---|---|---|---|---|
| 13 | 200 | Hexagonal 70% | None | — | — | — | 0.25 | 2.4 | 210 |
| 14 | 200 | Hexagonal 70% | SUS | Sputtering | 195 | 0.05 | 0.25 | 2.7 | 153 |
| 15 | 200 | Hexagonal 70% | Mica• polyimide | Binder | 5 | 0.1 | 0.2 | 3.8 | 160 |
| 16 | 200 | Hexagonal 70% | Polyimide | Sputtering | 3 | 0.08 | 0.26 | 2.5 | 176 |
| 17 | — | — | None | — | — | — | 1 | 2 | — |
| 18 | — | — | None | — | — | — | 0.3 | 3 | 250 |
| 19 | — | — | SUS | Sputtering | 195 | 0.05 | 0.25 | 2.7 | 200 |
| 20 | — | — | Pt | Sputtering | 172 | 0.03 | 0.18 | 2.8 | 193 |
| 21 | — | — | Polyimide | Sputtering | 3 | 0.08 | 0.26 | 2.5 | 194 |
| 22 | — | — | Alumina | Sputtering | 3.9 | 0.05 | 0.18 | 2.8 | 194 |
| 23 | — | — | SUS | Sputtering | 195 | 0.05 | 0.25 | 2.7 | 191 |
| 24 | — | — | None | — | — | — | 0.2 | 3 | 199 |

TABLE 3

| Measure-ment No. | Type and frequency of probe | Holder With or without holder | First sheet-like member Material | Young's modulus GPa | Thickness [mm] | Structure of second sheet-like member | Material A of second sheet-like member (9A in FIG. 1) Material | Young's modulus GPa | Yarn diameter [μm] | Aperture [μm] |
|---|---|---|---|---|---|---|---|---|---|---|
| 25 | Normal 5 MHz | With | Hydrogenated styrene-based thermoplastic elastomer (SEBS) | 0.001 | 1.0 | Mesh | Nylon | 1.1 | 430 | 1400 |
| 26 | Normal 5 MHz | With | Hydrogenated styrene-based thermoplastic elastomer (SEBS) | 0.001 | 1.0 | Mesh | Polyester | 3.5 | 71 | 246 |
| 27 | Angle 5 MHz | With | Hydrogenated styrene-based thermoplastic elastomer (SEBS) | 0.001 | 1.0 | Mesh | Nylon | 1.1 | 280 | 990 |
| 28 | Angle 5 MHz | With | Hydrogenated styrene-based thermoplastic elastomer (SEBS) | 0.001 | 1.0 | Mesh | Nylon | 1.1 | 500 | 1800 |
| 29 | Angle 5 MHz | With | Hydrogenated styrene-based thermoplastic elastomer (SEBS) | 0.001 | 1.0 | Mesh | Polyester | 3.0 | 55 | 199 |
| 30 | Angle 5 MHz | With | Hydrogenated styrene-based thermoplastic elastomer (SEBS) | 0.001 | 1.0 | Mesh | Polyester | 3.0 | 45 | 167 |
| 31 | Angle 5 MHz | With | Hydrogenated styrene-based thermoplastic elastomer (SEBS) | 0.001 | 1.0 | Mesh | Poly-propylene | 0.9 | 225 | 840 |
| 32 | Angle 5 MHz | With | Hydrogenated styrene-based thermoplastic elastomer (SEBS) | 0.001 | 1.0 | Mesh | Poly-propylene | 0.9 | 210 | 780 |
| 33 | Angle 5 MHz | With | Hydrogenated styrene-based thermoplastic elastomer (SEBS) | 0.001 | 1.0 | Mesh | Polyester | 3.0 | 150 | 600 |
| 34 | Angle 5 MHz | With | Hydrogenated styrene-based thermoplastic elastomer (SEBS) | 0.001 | 1.0 | Mesh | Polyester | 3.0 | 250 | 1000 |
| 35 | Angle 5 MHz | With | Hydrogenated styrene-based thermoplastic elastomer (SEBS) | 0.001 | 1.0 | Sheet having openings | PTFE | 0.6 | — | — |

| Measure-ment No. | Material A of second sheet-like member (9A in FIG. 1) Sheet thickness [μm] | Opening shape Opening ratio | Material B of second sheet-like member (9B in FIG. 1) Material | Film deposition method | Young's modulus GPa | Thick-ness [μm] | Coefficient of static friction under no load condition | Amplitude of echo waveform (arb. units) | Response speed (time required for echo waveform to reach 80% of saturation from load application) [ms] |
|---|---|---|---|---|---|---|---|---|---|
| 25 | — | — | Au | Sputtering | 82 | 0.05 | 0.2 | 3.5 | 198 |
| 26 | — | — | Mica•polyimide | Binder | 5 | 0.1 | 0.2 | 3.8 | 196 |
| 27 | — | — | SiO2•polyimide | Binder | 5 | 0.1 | 0.2 | 2.8 | 190 |
| 28 | — | — | None | — | — | — | 0.25 | 2.4 | 191 |
| 29 | — | — | SUS | Sputtering | 195 | 0.05 | 0.25 | 2.7 | 192 |
| 30 | — | — | SUS | Sputtering | 195 | 0.05 | 0.25 | 2.7 | 198 |
| 31 | — | — | SUS | Sputtering | 195 | 0.05 | 0.25 | 2.7 | 190 |
| 32 | — | — | SUS | Sputtering | 195 | 0.05 | 0.25 | 2.7 | 195 |
| 33 | — | — | SUS | Sputtering | 195 | 0.05 | 0.25 | 2.7 | 196 |
| 34 | — | — | SUS | Sputtering | 195 | 0.05 | 0.25 | 2.7 | 196 |
| 35 | 200 | Circular 60% | None | — | — | — | 0.18 | 3 | 194 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sonic inspection device comprising:

a sonic probe including a transducer configured to execute at least one of transmission and reception of a sound wave, the sonic probe having a sonic function surface constituting at least one of surfaces for transmitting the sound wave and for receiving the sound wave;

a contact member including a first sheet-like member and a second sheet-like member; and a loading mechanism that applies a load to the sonic probe, wherein the contact member includes:

the first sheet-like member containing an elastomer and having a first surface that comes into contact with the sonic function surface of the sonic probe directly or with an intermediate member therebetween and a second surface opposite the first surface; and the second sheet-like member having a plurality of openings and provided in contact with the second surface of the first sheet-like member, and wherein the second sheet-like member includes:

a base containing a polymer whose Young's modulus at room temperature is higher in Young's modulus at room temperature than the first sheet-like member; and a high-hardness member provided in at least a part of the base, the high-hardness member being in contact with the second surface and containing at least one selected from the group consisting of a polymer, a metal member, and a ceramic member higher in Young's modulus at room temperature than the base.

2. The device according to claim 1, wherein the first sheet-like member contains the elastomer whose Young's modulus at room temperature is less than 0.1 GPa, and wherein the base of the second sheet-like member contains the polymer whose Young's modulus at room temperature is 0.1 GPa or more.

3. The device according to claim 2, wherein the base is a mesh base; and the high-hardness member contains a metal member.

4. The device according to claim 3, wherein the mesh base has a circular cross section or an elliptical cross section.

5. A sonic inspection method using the sonic inspection device according to claim 1, the method comprising:

placing the sonic inspection device on an object to be inspected;

applying a load to the sonic probe to press the first sheet-like member against the object to bring the first sheet-like member into contact with the object through the second sheet-like member having the plurality of openings;

performing a sonic nondestructive inspection of the object using the sonic probe while keeping the first sheet-like member pressed against the object; and removing the load applied to the first sheet-like member and moving the sonic inspection device on the object while keeping the second sheet-like member having the plurality of openings in contact with the object to be inspected.

6. A sonic inspection device contact member, the contact member comprising:

a first sheet-like member containing an elastomer and having a first surface and a second surface opposite the first surface; and a second sheet-like member having a plurality of openings and provided in contact with the second surface of the first sheet-like member, wherein the second sheet-like member includes:

a base containing a polymer whose Young's modulus at room temperature is higher in Young's modulus at room temperature than the first sheet-like member; and a high-hardness member provided in at least a part of the base, the high-hardness member being in contact with the second surface and containing at least one selected from a polymer, a metal member, and a ceramic member higher in Young's modulus at room temperature than the base.

7. The contact member according to claim 6, wherein the first sheet-like member contains an elastomer whose Young's modulus at room temperature is less than 0.1 GPa, and wherein the base of the second sheet-like member contains a polymer whose Young's modulus at room temperature is 0.1 GPa or more.

8. The contact member according to claim 7, wherein the base is a mesh base; and the high-hardness member is a metal member.

* * * * *